P. B. BOSWORTH.
DETACHABLE FASTENING FOR PNEUMATIC TIRES.
APPLICATION FILED JAN. 17, 1907.
977,587.
Patented Dec. 6, 1910.
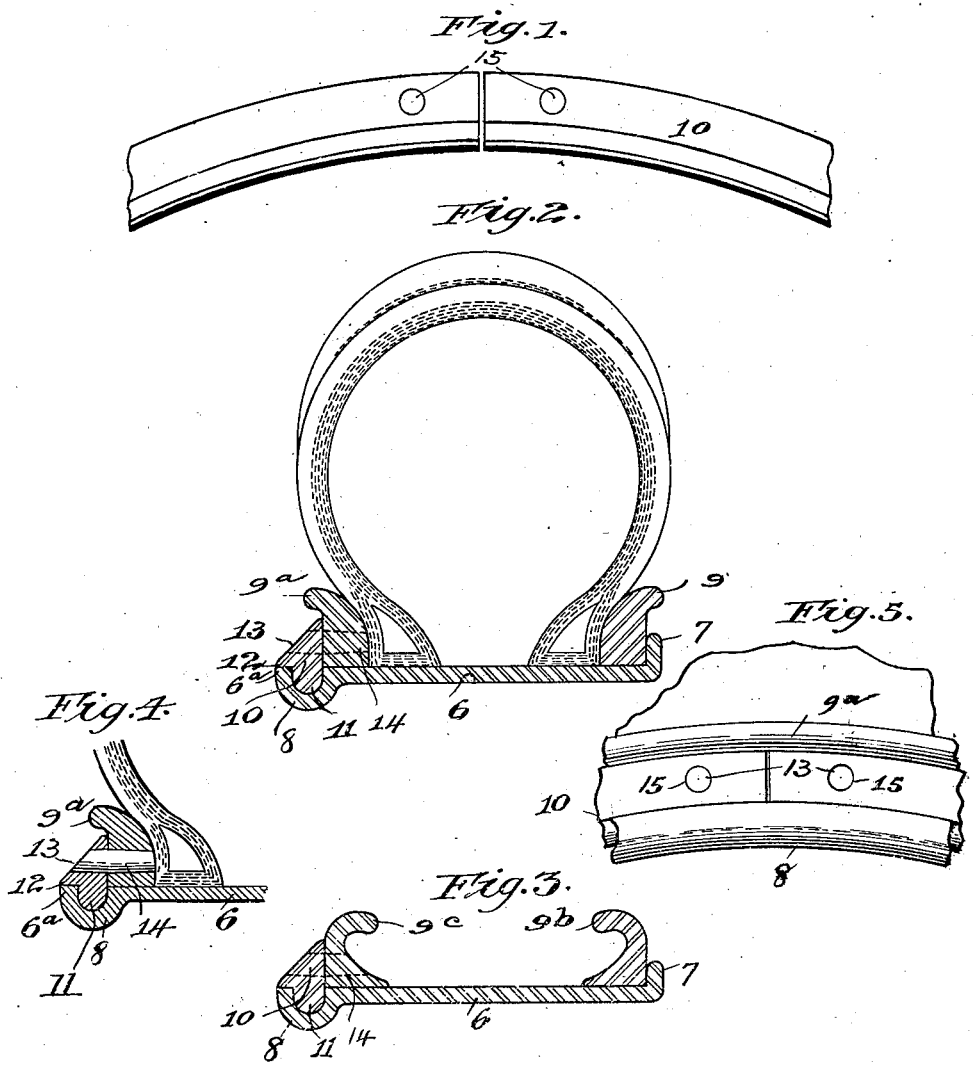

UNITED STATES PATENT OFFICE.

PERCY B. BOSWORTH, OF AKRON, OHIO, ASSIGNOR TO FIRESTONE TIRE & RUBBER COMPANY, OF AKRON, OHIO, A CORPORATION OF WEST VIRGINIA.

DETACHABLE FASTENING FOR PNEUMATIC TIRES.

977,587. Specification of Letters Patent. Patented Dec. 6, 1910.

Application filed January 17, 1907. Serial No. 352,752.

*To all whom it may concern:*

Be it known that I, PERCY B. BOSWORTH, a citizen of the United States, residing at Akron, in the county of Summit and State of Ohio, have invented certain new and useful Improvements in Detachable Fastenings for Pneumatic Tires, of which the following is a specification.

The object of my invention is to provide for the secure holding and ready removal of pneumatic tires for vehicle wheels and particularly for that class of pneumatic tires used in automobiles.

A further object of my invention is to provide a fastening means of such construction that it may be employed with tires of the clencher type or of the Dunlop type, meaning thereby a tire which is held by inflation. But my fastening means are of such construction that they may be readily adapted to tires of various types;—that is to say, these fastenings are of the so-called universal sort.

My improvement relates to that class of devices having in combination a metallic rim having one integral flange upstanding from one of its edges, a seat for a locking ring formed in its opposite edge below its surface, holding members each in the form of an annulus adapted to be slipped over said rim and snugly fitted thereon and having their inner sides shaped to conform to the outer sides of the base of the tire, and a split locking ring having a portion adapted to be seated in the groove of the rim, and means for detachably engaging the ends of the split locking ring with the holding ring or annulus adjacent thereto.

As a specific improvement I make the holding ring or annulus and the locking ring of such section that there is provided an extended bearing surface between the two, the line of contact or bearing being in a plane at right angles to the surface of the rim, and the locking ring is provided not only with a bead to engage the groove in the rim, but with a shoulder outside of said bead whereby a firm abutment is provided, and when the parts are engaged by means of pins or other engaging means the rocking or turning of the holding ring out of its seat is avoided, and a very rigid abutment is provided for the tire. The holding rings may be of a section to adapt them for use in connection with a tire of the Dunlop type, which are held on by inflation, or to the clencher type of tire, or to any other form, the only necessary changes in this regard being that the inner surfaces of said annular holding rings should be conformable to the base of the tire with which they are employed.

In the accompanying drawings,—Figure 1 is a broken side elevation from the outside of the ends of the split locking ring; Fig. 2 is a transverse sectional elevation of the tire, the rim, and the holding means; Fig. 3 is a similar view of the rim, holding rings, and locking ring, the holding members being of the type adapted to a clencher tire; Fig. 4 is a sectional detail through the holding ring and the locking ring in the line of the engaging pin, the latter being shown in elevation; and Fig. 5 is a broken side elevation of the tire, rim and holding means.

In the drawings, 6 represents a metallic rim which is adapted to be fitted to the felly of a wheel, and is provided with an integral upstanding flange 7 at one edge thereof and with a depressed locking seat or groove 8 in the surface of its opposite edge.

In Fig. 2, 9, $9^a$ represent holding rings of annular form adapted for use in connection with a tire of the Dunlop type, said holding rings having their faces curved to conform to the exterior of the tire base, and their outer or bearing faces formed in planes at right angles to the rim. 10 represents a split locking ring which is provided on its perimeter with a bead 11 adapted to the groove 8. The open side or mouth of the groove 8 is of a width not less than the maximum width of the groove, whereby the locking ring is adapted to enter the groove through said open side of the latter and to seat therein. The inner surface of this locking ring is parallel to the plane of the ring and therefore adapted to abut squarely upon the holding ring $9^a$. Upon its outer side the locking ring is provided with a shoulder or rib 12 which overlies the terminal portion $6^a$ of the rim external to the seat, while the outer or exposed portion of the locking ring is preferably beveled as shown at 13. The bearing face of the locking ring is of such height as to afford a secure abutment for the holding ring $9^a$, the plane of contact being vertical to the face of the rim 6. One of the holding rings abuts against the integral flange 7, the bearing surface being also in a vertical plane. The holding ring adjacent to the ends of the locking ring is provided with holding pins 14, these pins being preferably tapered and fitted to tapered holes in the ring $9^a$ and secured thereto by riveting or upsetting their inner ends. The pins 14 project beyond the bearing face of the ring $9^a$, and the locking ring 10 has apertures 15 to receive the protruding ends of the pins, and these protruding ends are likewise preferably tapered. The rings 9 and $9^a$ have an internal diameter to adapt them to fit snugly over the rim 6, and in application it will be understood that one of said holding rings will be slipped over the rim so as to bear against the flange 7, while the ring on the opposite side will be pushed back to enable the locking ring to be put in place, and the tire being then inflated, the several parts are brought to their proper positions and snugly hold the tire against dislodgement so long as it remains inflated. Obviously the tire can be readily detached and a new one applied.

In Fig. 3 I have shown holding rings $9^b$, $9^c$, which have an inner contour adapting them to be used with the clencher type of tire, the external bearing faces and the relation to the locking ring and rim being the same as in the preceding figure.

While it is obviously essential that the inner contour of the holding rings shall be adapted to the particular style or type of tire employed, and hence the section of the holding ring is subject to modification to this extent, it will be found in actual practice that by arranging the bearing faces of the holding ring, rim flange, and locking ring in vertical planes, a more secure and reliable fastening is provided. Further it will appear that by reason of the peculiar shape or section of the locking ring when used in connection with a holding ring of the form described, any tendency to dislodge the locking ring from its seat will be resisted, and that by reason of the bearings being arranged in vertical planes there is no inherent tendency to turn or rock the locking ring out of its seat because the strains are exerted parallel to the face of the rim instead of at an angle thereto as in the usual construction.

I claim:

1. The combination with a metallic rim for a vehicle wheel having a retaining means at one of its edges, of an annular holding ring adapted to afford an outer abutment for the base of the tire, and bearing upon said retaining means, a second holding ring, and a locking ring adapted to confine said second holding ring upon the rim, said locking ring being split and having its ends secured to said second holding ring by taper pins, substantially as described.

2. In a construction of the character described, the combination of a vehicle wheel rim having a groove near one edge, a rim flange adapted to be applied to said rim by sliding over said groove, a contractible locking ring adapted to be sprung into the groove and having a laterally-projecting shoulder bearing on the rim outwardly of said groove, and means connecting the rim flange and locking ring adapted to hold the latter in the groove, said means comprising tapered pins and coöperating apertures adapted to receive said pins, substantially as described.

PERCY B. BOSWORTH.

Witnesses:
FREDERICK C. GOODWIN,
WALTER M. FULLER.